US006658383B2

(12) United States Patent
Koishida et al.

(10) Patent No.: US 6,658,383 B2
(45) Date of Patent: Dec. 2, 2003

(54) METHOD FOR CODING SPEECH AND MUSIC SIGNALS

(75) Inventors: Kazuhito Koishida, Goleta, CA (US); Vladimir Cuperman, Goleta, CA (US); Amir H. Majidimehr, Woodinville, WA (US); Allen Gersho, Goleta, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/892,105

(22) Filed: Jun. 26, 2001

(65) Prior Publication Data

US 2003/0004711 A1 Jan. 2, 2003

(51) Int. Cl.[7] ......................... G10L 19/02; G10L 19/04; G10L 19/00; H04Q 1/20; H04B 14/06

(52) U.S. Cl. ....................... 704/229; 704/219; 704/230; 375/225; 375/244

(58) Field of Search ................................ 704/278, 267, 704/262, 230, 229, 220, 211, 206, 201

(56) References Cited

U.S. PATENT DOCUMENTS

| | | | | | |
|---|---|---|---|---|---|
| 5,394,473 | A | * | 2/1995 | Davidson | 375/240 |
| 5,717,823 | A | | 2/1998 | Kleijn | |
| 5,734,789 | A | | 3/1998 | Swaminathan et al. | |
| 5,751,903 | A | | 5/1998 | Swaminathan et al. | |
| 5,778,335 | A | * | 7/1998 | Ubale et al. | 704/219 |
| 6,108,626 | A | | 8/2000 | Cellario et al. | |
| 6,134,518 | A | * | 10/2000 | Cohen et al. | 704/201 |
| 6,240,387 | B1 | | 5/2001 | De Jaco | |
| 6,310,915 | B1 | | 10/2001 | Wells et al. | |
| 6,311,154 | B1 | | 10/2001 | Gersho et al. | |
| 6,351,730 | B2 | * | 2/2002 | Chen | 704/219 |
| 2001/0023395 | A1 | | 9/2001 | Su et al. | |

FOREIGN PATENT DOCUMENTS

| | | |
|---|---|---|
| WO | WO 9827543 | 6/1998 |

OTHER PUBLICATIONS

Lefebvre, et al., "High quality coding of wideband audio signals using transform coded excitation (TCX)," Apr. 1994, 1994 IEEE International Confernece on Acoustics, Speech, and Signal Processing, vol. 1, pp. I/193–I/196.*

Salami, et al., "A wideband codec at 16/24 kbit/s with 10 ms frames," Sep. 1997, 1997 Workshop on Speech Coding for Telecommunications , pp 103–104.*

ITU–T, G.722.1 (09/99), Series G: Transmission Systems and Media, Digital Systems and Networks, Coding at 24 and 32 kbit/s for hands–free operation in systems with low frame loss.*

Saunders, J., "Real Time Discrimination of Broadcast Speech/Music," *Proceedings of IEEE International Conference on Acoustics, Speech, and Signal Processing*, vol. 2, pp. 993–996 (May 1996).

(List continued on next page.)

*Primary Examiner*—Marsha D. Banks-Harold
*Assistant Examiner*—V. Paul Harper
(74) *Attorney, Agent, or Firm*—Leydig, Voit & Mayer, Ltd.

(57) ABSTRACT

The present invention provides a transform coding method efficient for music signals that is suitable for use in a hybrid codec, whereby a common Linear Predictive (LP) synthesis filter is employed for both speech and music signals. The LP synthesis filter switches between a speech excitation generator and a transform excitation generator, in accordance with the coding of a speech or music signal, respectively. For coding speech signals, the conventional CELP technique may be used, while a novel asymmetrical overlap-add transform technique is applied for coding music signals. In performing the common LP synthesis filtering, interpolation of the LP coefficients is conducted for signals in overlap-add operation regions. The invention enables smooth transitions when the decoder switches between speech and music decoding modes.

7 Claims, 11 Drawing Sheets

An example of network-linked hybrid speech/music codecs

OTHER PUBLICATIONS

Scheirer, E., et al., "Construction and Evalutaiton of A Robust Multifeature Speech/Music Discriminator," *In Proceedings of IEEE International Conference on Acoustics, Speech, and Signal Processing*, vol. 2, pp. 1331–1334, (Apr. 1997).

Combescure, P., et al., "A16, 24, 32 kbit/s Wideband Speech Codec Based on ATCELP," *In Proceedings of IEEE International Conference On Acoustics, Speech, and Signal Processing*, vol. 1, pp. 5–8 (Mar. 1999).

Ellis, D., et al., "Speech/Music Discrimination Based on Posterior Probability Features," *In Proceedings of Eurospeech*, 4 pages, Budapest (1999).

El Maleh, K., et al. "Speech/Music Discrimination for Multimedia Applications," *In Proceedings of IEEE International Conference on Acoustics, Speech, and Signal Processing*, vol. 4, pp. 2445–2448, (Jun. 2000).

Houtgast, T., et al., "The Modulation Transfer Function In Room Acoustics As A Predictor of Speech Intelligibility," *Acustica*, vol. 23, pp. 66–73 (1973).

Tzanetakis, G., et al., "Multifeature Audio Segmentation for Browsing and Annotation," *Proc. IEEE Workshop on Applications of Signal Processing to Audio and Acoustics*, New Paltz, NY, pp. 103–106 (Oct. 1999).

J. Schnitzler, J. Eggers, C. Erdmann and P. Vary, "Wideband Speech Coding Using Forward/Backward Adaptive Prediction with Mixed Time/Fre quency Domain Excitation," in Proc. IEEE Workshop on Speech Coding, pp. 3–5, 1999.

B. Bessette, R. Salami, C. Laflamme and R. Lefebvre, "A Wideband Speech and Audio Codec at 16/24/32 kbit/s using Hybrid ACELP/TCX Techniques," in Proc. IEEE Workshop on Speech Coding, pp. 7–9, 1999.

S.A. Ramprashad, "A Multimode Transform Predictive Coder (MTPC) for Speech and Audio," in Proc. IEEE Workshop on Speech Coding, pp. 10–12, 1999.

L. Tancerel, R. Vesa, V.T. Ruoppila and R. Lefebvre, "Combined Speech and Audio Coding by Discrimination," in Proc. IEEE Workshop on Speech Coding, pp. 154–156, 2000.

J–H. Chen and D. Wang, "Transform Predictive Coding of Wideband Speech Signals," in Proc. International Conference on Acoustic, Speech, Signal Processing, pp. 275–278, 1996.

A. Ubale and A. Gersho, "Multi–Band CELP Wideband Speech Coder," Proc. IEEE Int. Conf. on Acoustics, Speech and Signal Processing, Munich, pp. 1367–1370.

* cited by examiner

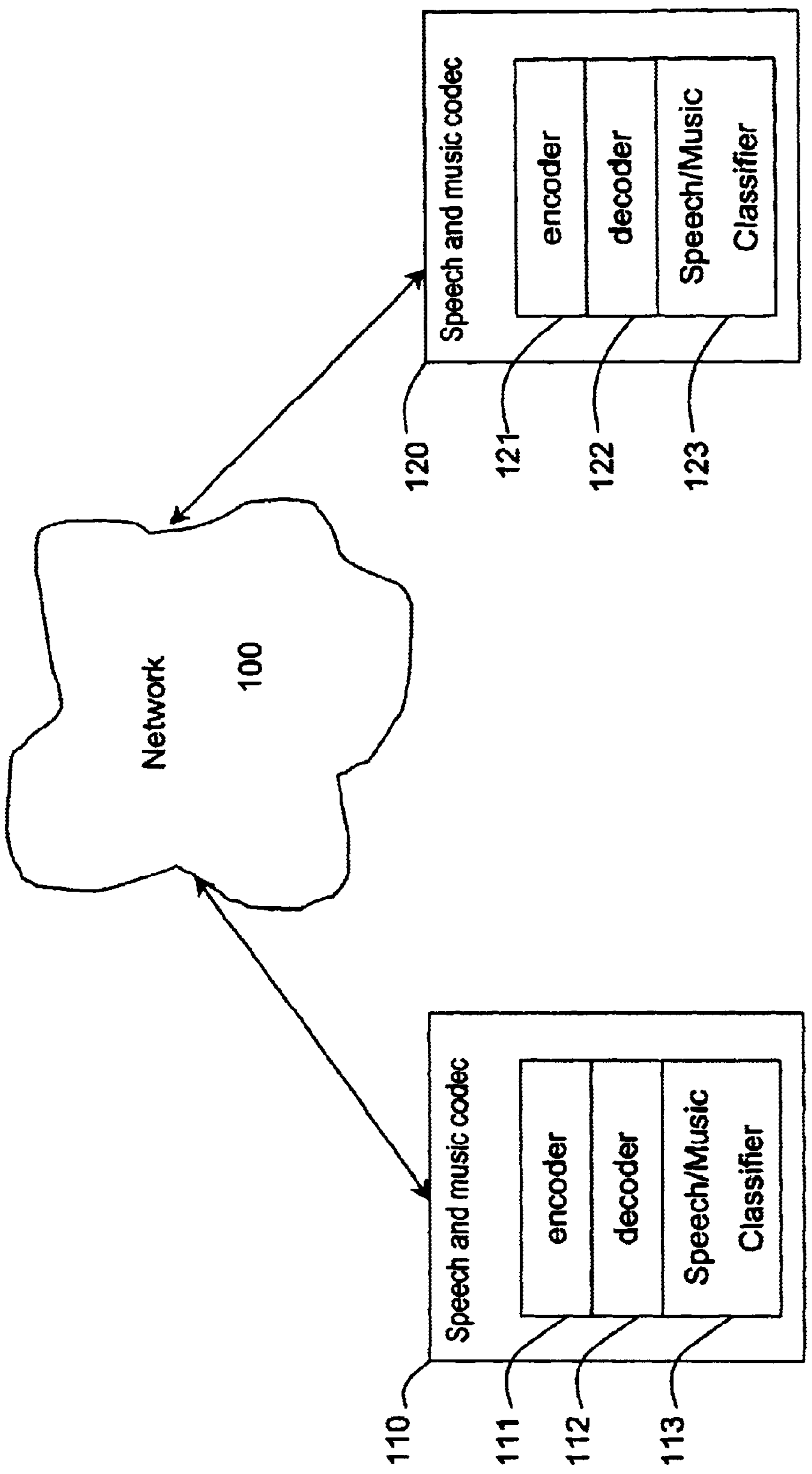
FIG. 1 An example of network-linked hybrid speech/music codecs

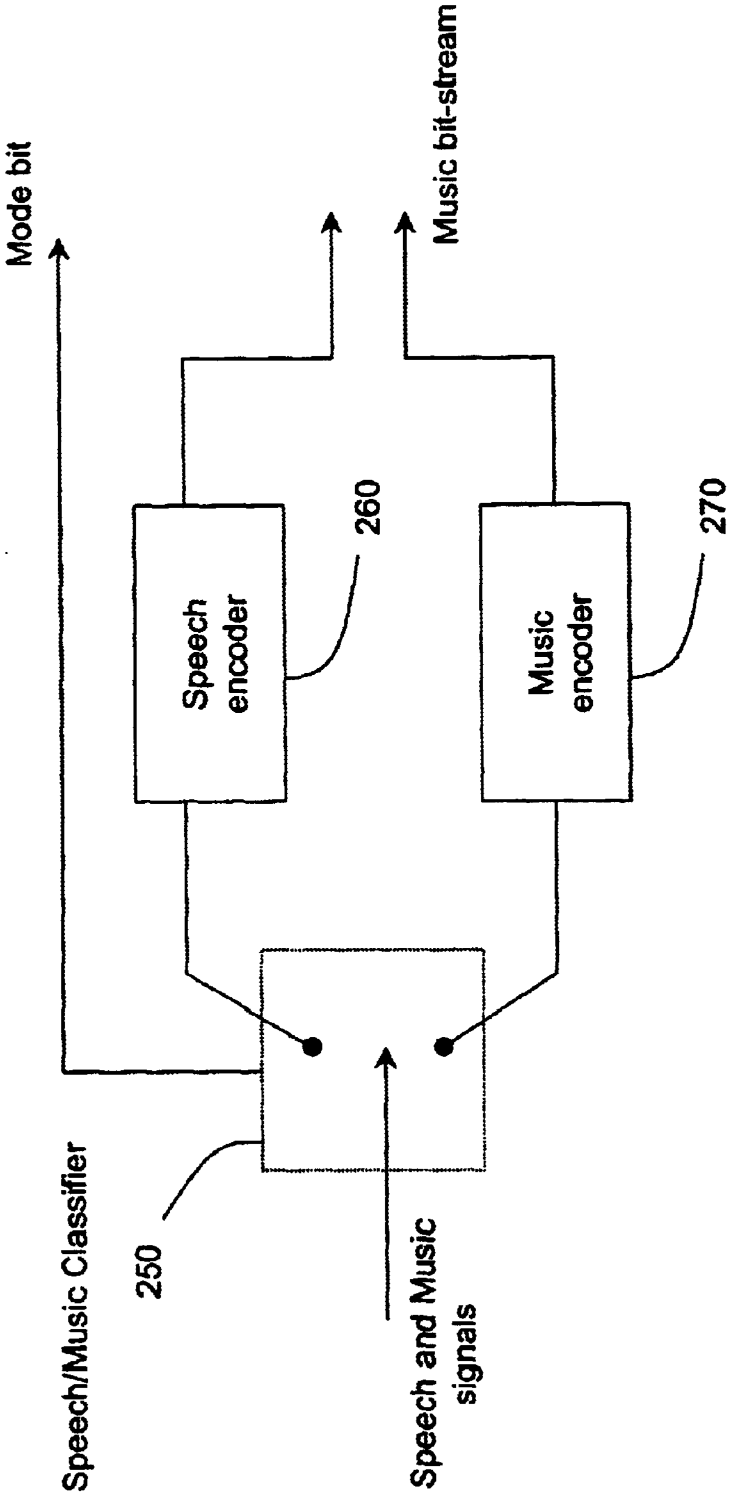
FIG.2a High-level structure of hybrid speech/music encoder

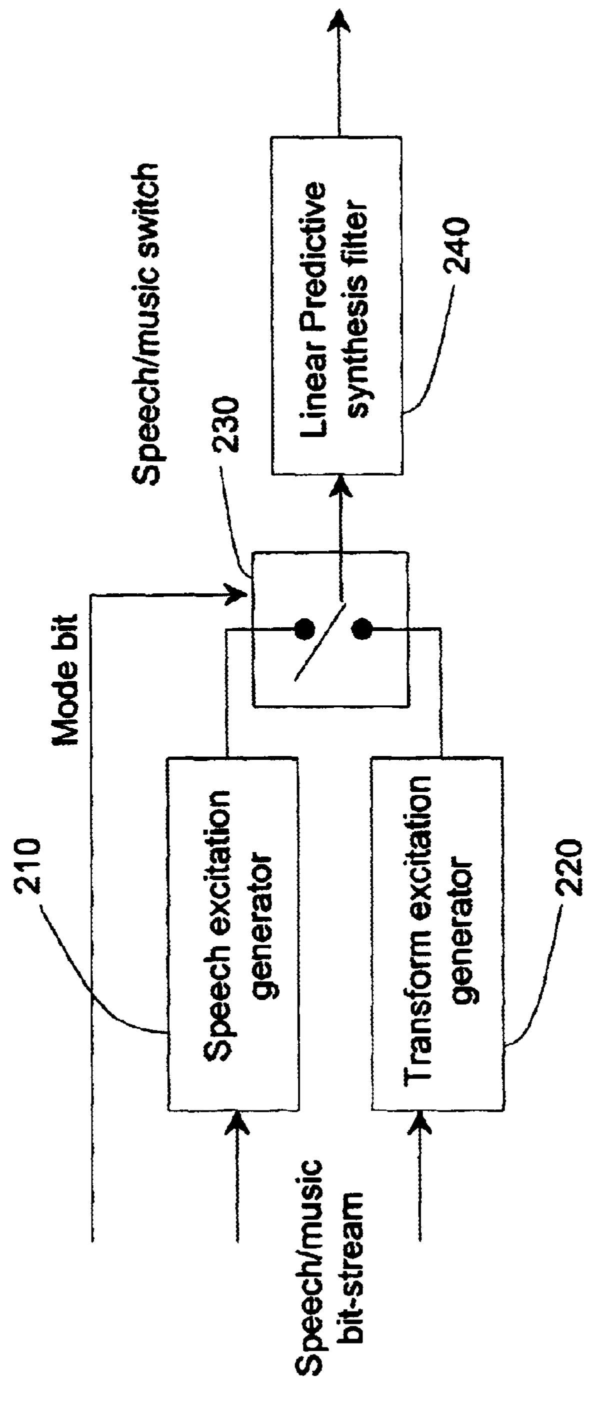
FIG.2b High-level structure of hybrid speech/music decoder

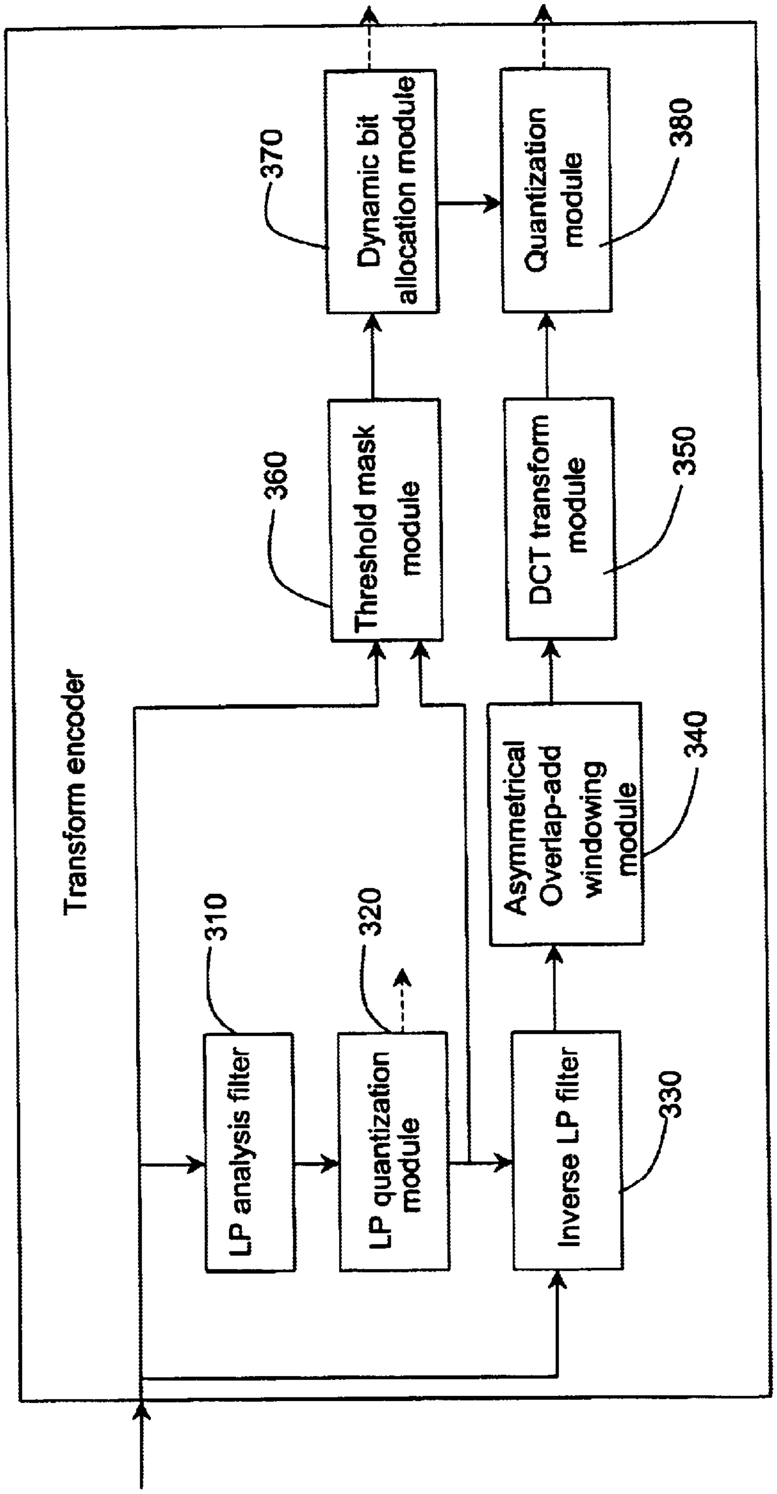
FIG.3a Transform encoder

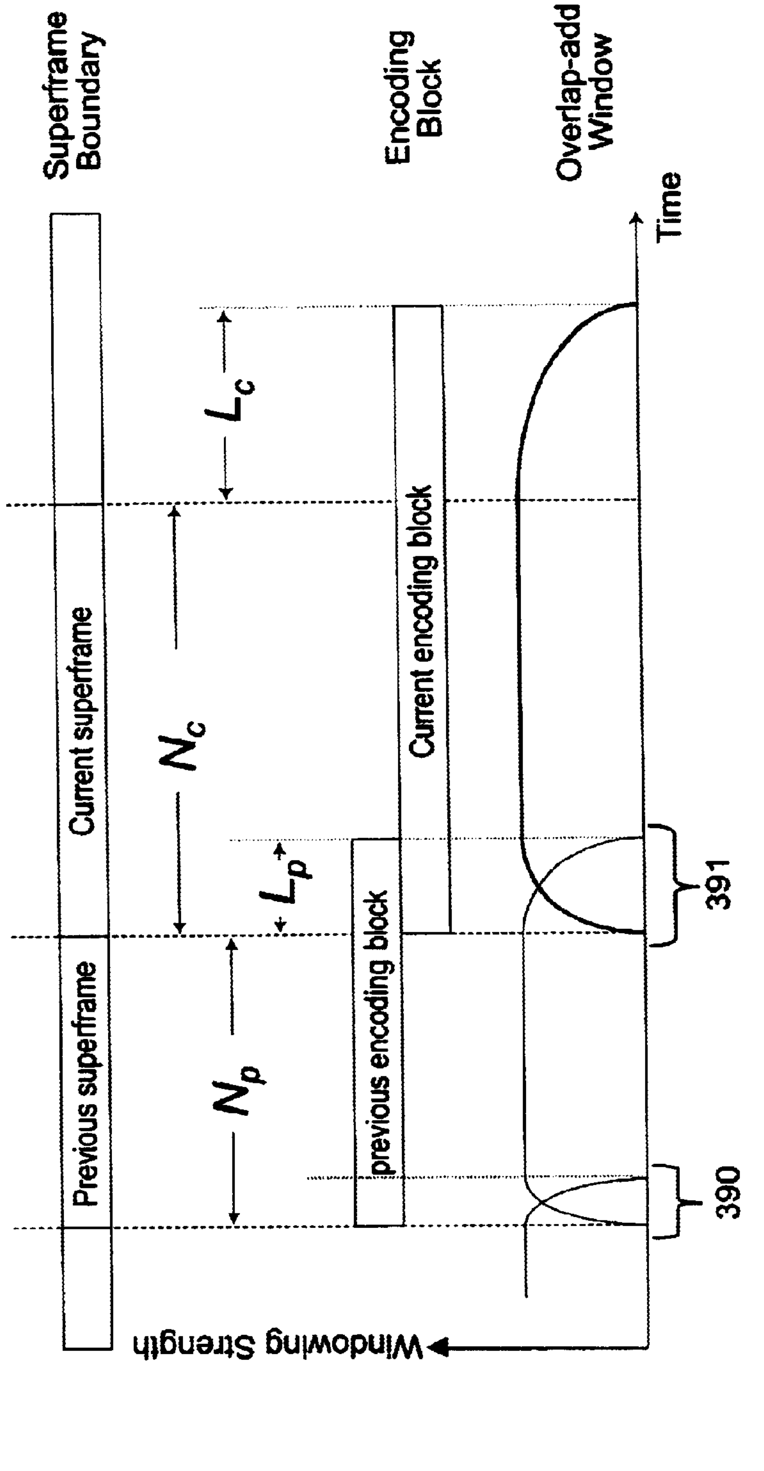
FIG.3b Asymmetrical overlap-add window operation and effect

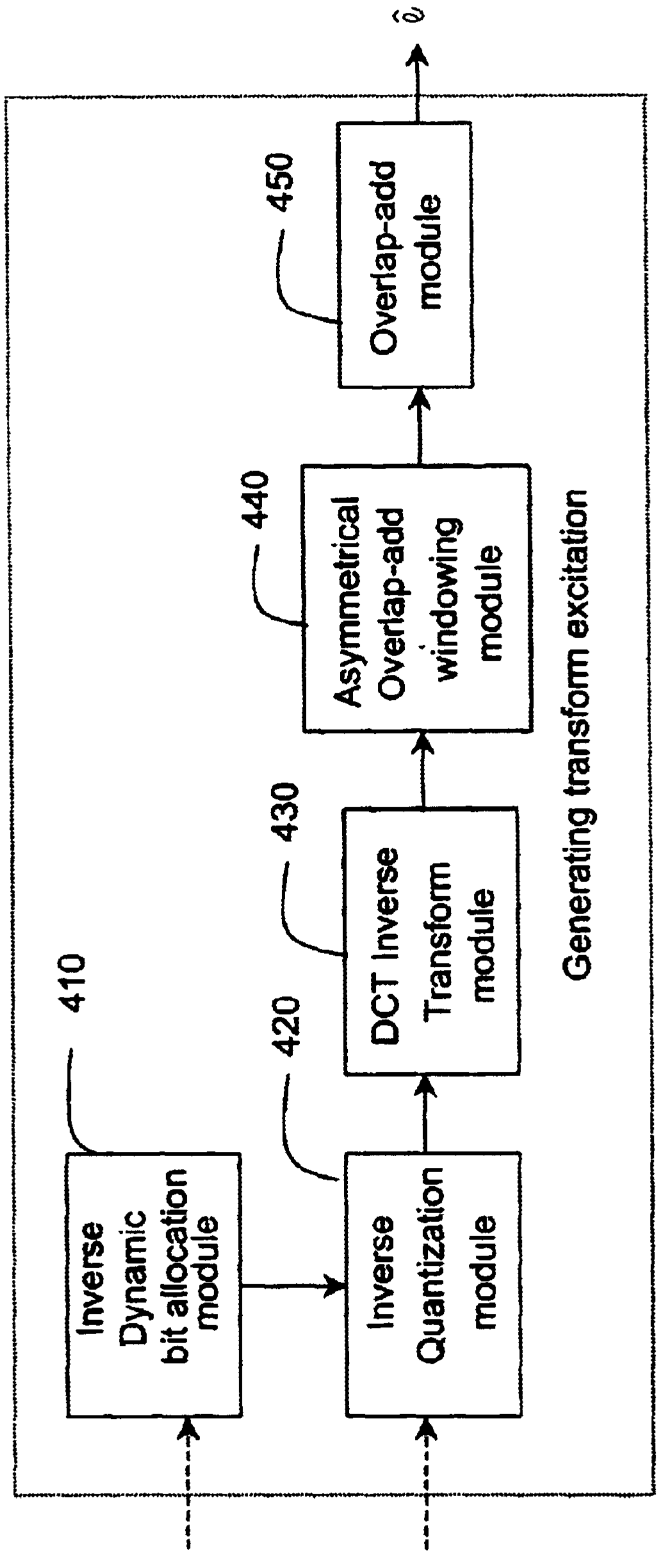
FIG.4 Transform decoder

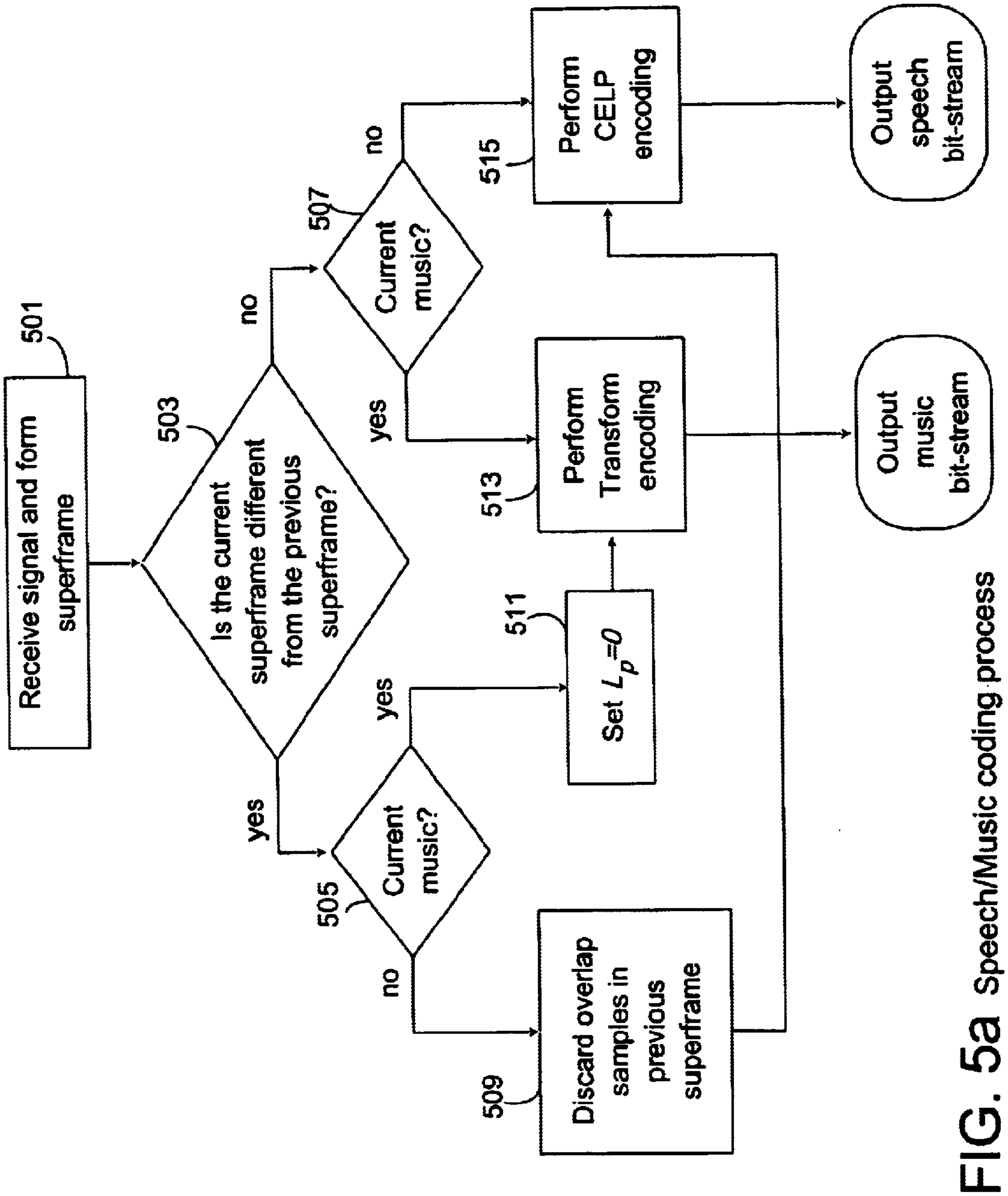
FIG. 5a Speech/Music coding process

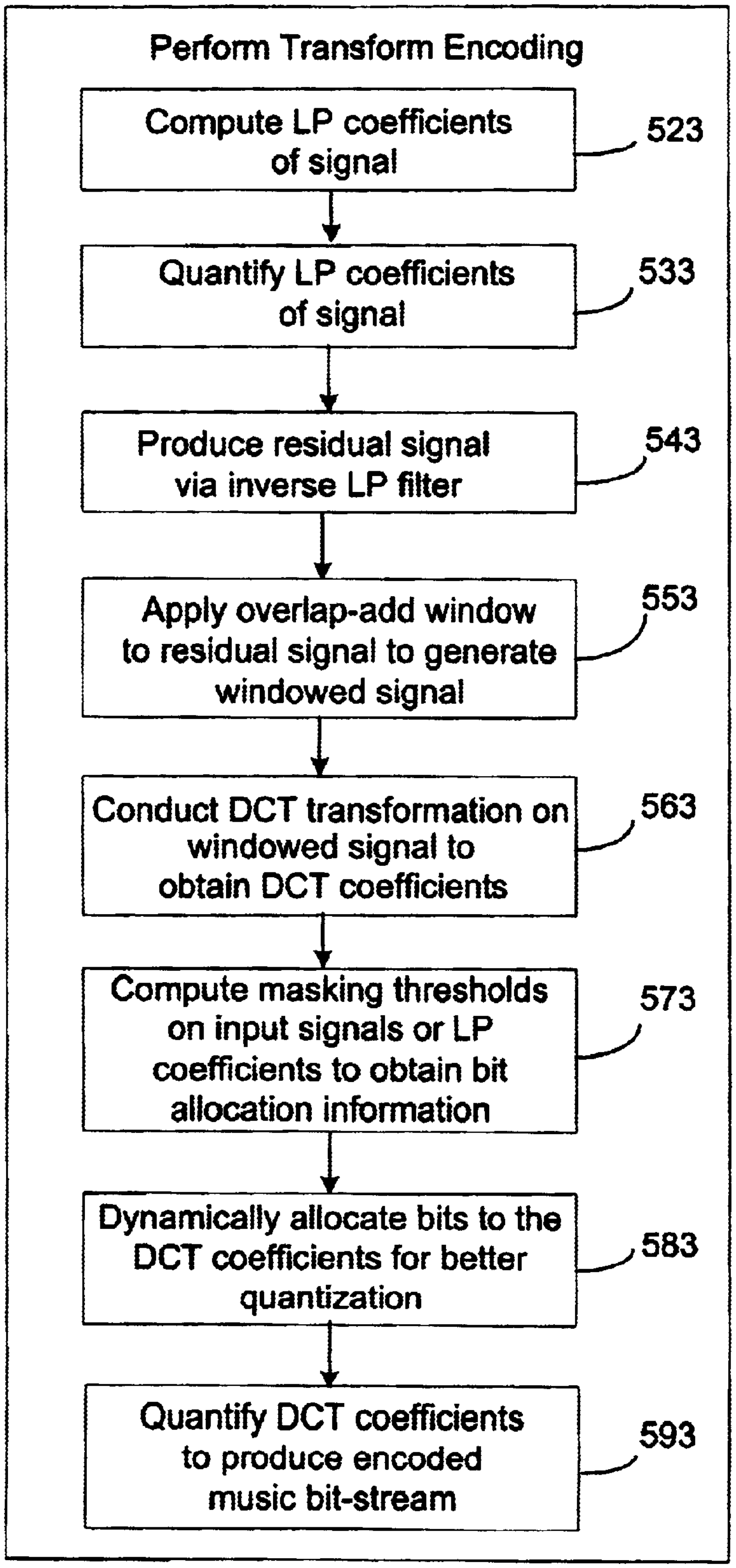
FIG. 5b Transform encoding

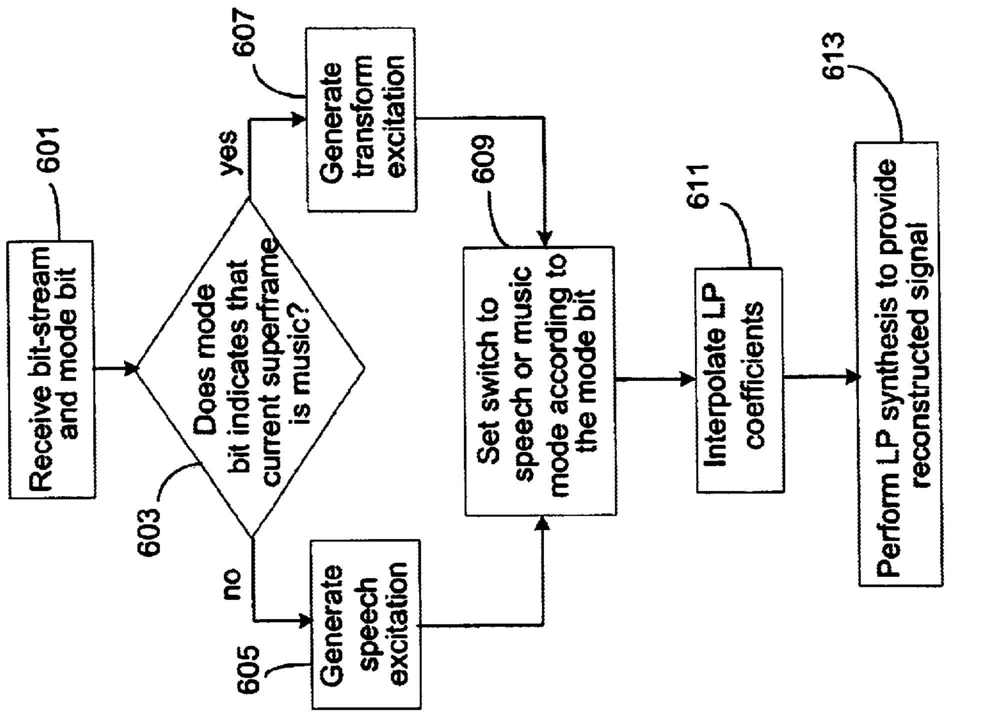
FIG. 6a Speech/Music decoding process

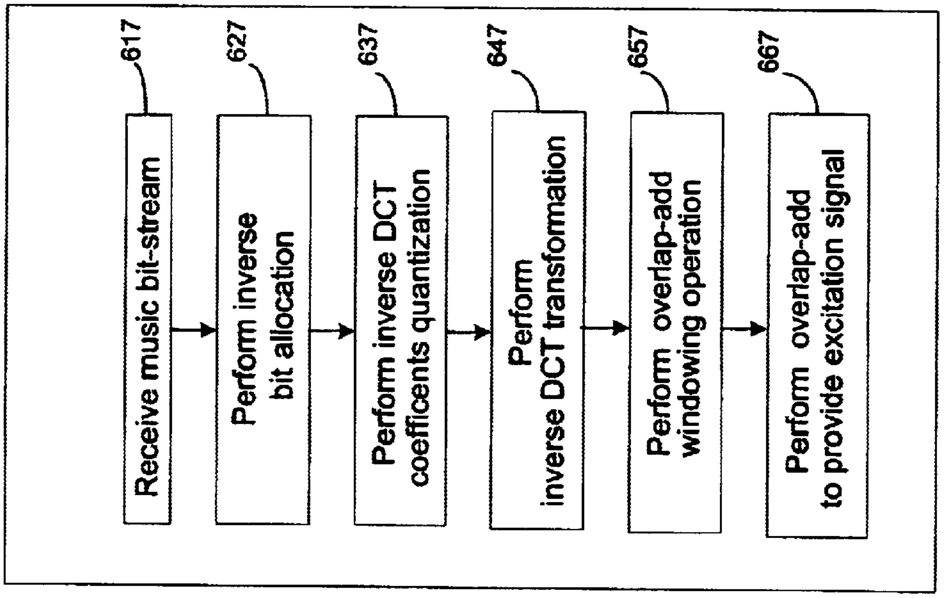
FIG. 6b Generation of Transform Excitation

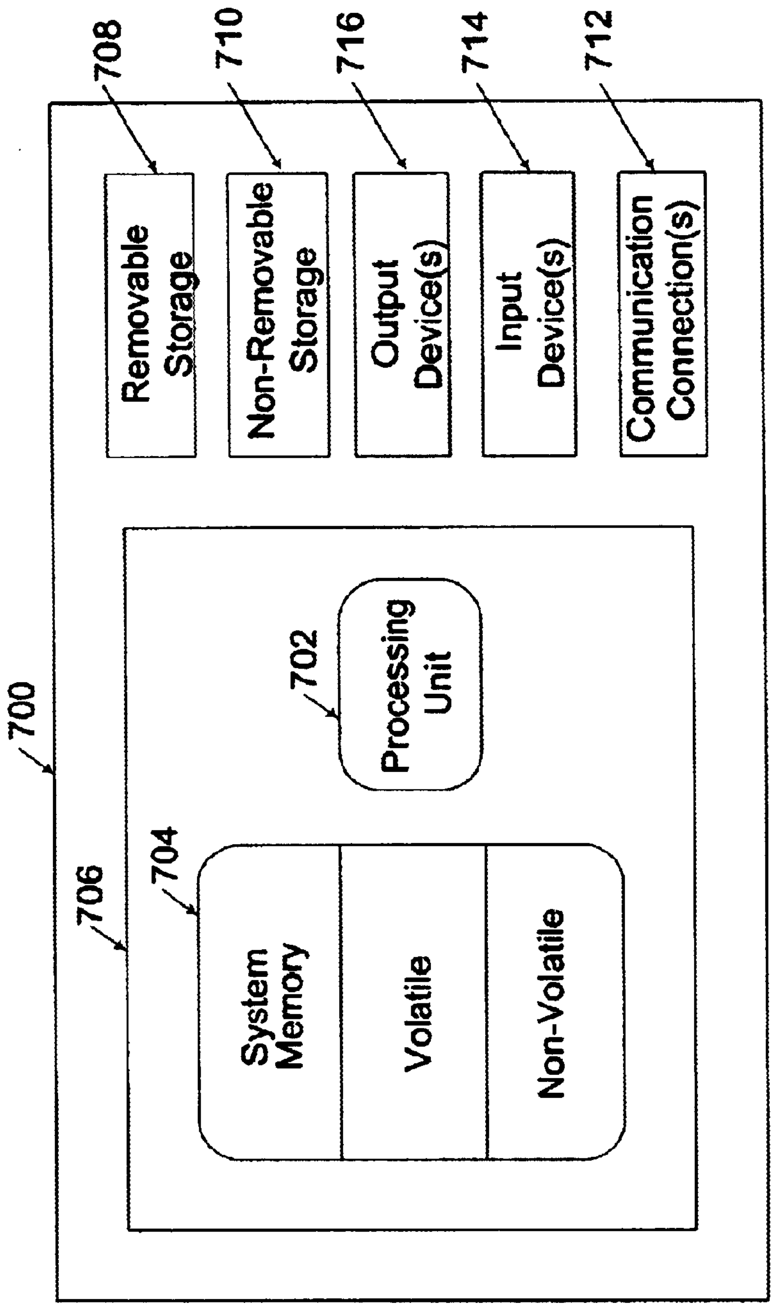
FIG. 7 Computer Architecture

METHOD FOR CODING SPEECH AND MUSIC SIGNALS

FIELD OF THE INVENTION

This invention is directed in general to a method and an apparatus for coding signals, and more particularly, for coding both speech signals and music signals.

BACKGROUND OF THE INVENTION

Speech and music are intrinsically represented by very different signals. With respect to the typical spectral features, the spectrum for voiced speech generally has a fine periodic structure associated with pitch harmonics, with the harmonic peaks forming a smooth spectral envelope, while the spectrum for music is typically much more complex, exhibiting multiple pitch fundamentals and harmonics. The spectral envelope may be much more complex as well. Coding technologies for these two signal modes are also very disparate, with speech coding being dominated by model-based approaches such as Code Excited Linear Prediction (CELP) and Sinusoidal Coding, and music coding being dominated by transform coding techniques such as Modified Lapped Transformation (MLT) used together with perceptual noise masking.

There has recently been an increase in the coding of both speech and music signals for applications such as Internet multimedia, TV/radio broadcasting, teleconferencing or wireless media. However, production of a universal codec to efficiently and effectively reproduce both speech and music signals is not easily accomplished, since coders for the two signal types are optimally based on separate techniques. For example, linear prediction-based techniques such as CELP can deliver high quality reproduction for speech signals, but yield unacceptable quality for the reproduction of music signals. On the other hand, the transform coding-based techniques provide good quality reproduction for music signals, but the output degrades significantly for speech signals, especially in low bit-rate coding.

An alternative is to design a multi-mode coder that can accommodate both speech and music signals. Early attempts to provide such coders are for example, the Hybrid ACELP/Transform Coding Excitation coder and the Multi-mode Transform Predictive Coder (MTPC). Unfortunately, these coding algorithms are too complex and/or inefficient for practically coding speech and music signals.

It is desirable to provide a simple and efficient hybrid coding algorithm and architecture for coding both speech and music signals, especially adapted for use in low bit-rate environments.

SUMMARY OF THE INVENTION

The invention provides a transform coding method for efficiently coding music signals. The transform coding method is suitable for use in a hybrid codec, whereby a common Linear Predictive (LP) synthesis filter is employed for reproduction of both speech and music signals. The LP synthesis filter input is switched between a speech excitation generator and a transform excitation generator, pursuant to the coding of a speech signal or a music signal, respectively. In a preferred embodiment, the LP synthesis filter comprises an interpolation of the LP coefficients. In the coding of speech signals, a conventional CELP or other LP technique may be used, while in the coding of music signals, an asymmetrical overlap-add transform technique is preferably applied. A potential advantage of the invention is that it enables a smooth output transition at points where the codec has switched between speech coding and music coding.

Additional features and advantages of the invention will be made apparent from the following detailed description of illustrative embodiments that proceeds with reference to the accompanying figures.

BRIEF DESCRIPTION OF THE INVENTION

While the appended claims set forth the features of the present invention with particularity, the invention, together with its objects and advantages, may be best understood from the following detailed description taken in conjunction with the accompanying drawings of which:

FIG. 1 illustrates exemplary network-linked hybrid speech/music codecs according to an embodiment of the invention;

FIG. 2*a* illustrates a simplified architectural diagram of a hybrid speech/music encoder according to an embodiment of the invention;

FIG. 2*b* illustrates a simplified architectural diagram of a hybrid speech/music decoder according to an embodiment of the invention;

FIG. 3*a* is a logical diagram of a transform encoding algorithm according to an embodiment of the invention;

FIG. 3*b* is a timing diagram depicting an asymmetrical overlap-add window operation and its effect according to an embodiment of the invention;

FIG. 4 is a block diagram of a transform decoding algorithm according to an embodiment of the invention;

FIGS. 5*a* and 5*b* are flow charts illustrating exemplary steps taken for encoding speech and music signals according to an embodiment of the invention;

FIGS. 6*a* and 6*b* are flow charts illustrating exemplary steps taken for decoding speech and music signals according to an embodiment of the invention; and FIG. 7 is a simplified schematic illustrating a computing device architecture employed by a computing device upon which an embodiment of the invention may be executed.

DETAILED DESCRIPTION OF THE INVENTION

The present invention provides an efficient transform coding method for coding music signals, the method being suitable for use in a hybrid codec, wherein a common Linear Predictive (LP) synthesis filter is employed for the reproduction of both speech and music signals. In overview, the input of the LP synthesis filter is dynamically switched between a speech excitation generator and a transform excitation generator, corresponding to the receipt of either a coded speech signal or a coded music signal, respectively. A speech/music classifier identifies an input speech/music signal as either speech or music and transfers the identified signal to either a speech encoder or a music encoder as appropriate. During coding of a speech signal, a conventional CELP technique may be used. However, a novel asymmetrical overlap-add transform technique is applied for the coding of music signals. In a preferred embodiment of the invention, the common LP synthesis filter comprises an interpolation of LP coefficients, wherein the interpolation is conducted every several samples over a region where the excitation is obtained via an overlap. Because the output of the synthesis filter is not switched, but only the input of the synthesis filter, a source of audible signal discontinuity is avoided.

An exemplary speech/music codec configuration in which an embodiment of the invention may be implemented is described with reference to FIG. 1. The illustrated environment comprises codecs 110, 120 communicating with one another over a network 100, represented by a cloud. Network 100 may include many well-known components, such as routers, gateways, hubs, etc. and may provide communications via either or both of wired and wireless media. Each codec comprises at least an encoder 111, 121, a decoder 112, 122, and a speech/music classifier 113, 123.

In an embodiment of the invention, a common linear predictive synthesis filter is used for both music and speech signals. Referring to FIGS. 2*a* and 2*b*, the structure of an exemplary speech and music codec wherein the invention may be implemented is shown. In particular, FIG. 2*a* shows the high-level structure of a hybrid speech/music encoder, while FIG. 2*b* shows the high-level structure of a hybrid speech/music decoder. Referring to FIG. 2*a*, the speech/music encoder comprises a speech/music classifier 250, which classifies an input signal as either a speech signal or a music signal. The identified signal is then transmitted accordingly to either a speech encoder 260 or a music encoder 270, respectively, and a mode bit characterizing the speech/music nature of input signal is generated. For example, a mode bit of zero represents a speech signal and a mode bit of 1 represents a music signal. The speech encoder 260 encodes an input speech based on the linear predictive principle well known to those skilled in the art and outputs a coded speech bit-stream. The speech coding used is for example, a codebook excitation linear predictive (CELP) technique, as will be familiar to those of skill in the art. In contrast, the music encoder 270 encodes an input music signal according to a transform coding method, to be described below, and outputs a coded music bit-stream.

Referring to FIG. 2*b*, a speech/music decoder according to an embodiment of the invention comprises a linear predictive (LP) synthesis filter 240 and a speech/music switch 230 connected to the input of the filter 240 for switching between a speech excitation generator 210 and a transform excitation generator 220. The speech excitation generator 210 receives the transmitted coded speech/music bit-stream and generates speech excitation signals. The music excitation generator 220 receives the transmitted coded speech/music signal and generates music excitation signals. There are two modes in the coder, namely a speech mode and a music mode. The mode of the decoder for a current frame or superframe is determined by the transmitted mode bit. The speech/music switch 230 selects an excitation signal source pursuant to the mode bit, selecting a music excitation signal in music mode and a speech excitation signal in speech mode. The switch 230 then transfers the selected excitation signal to the linear predictive synthesis filter 240 for producing the appropriate reconstructed signals. The excitation or residual in speech mode is encoded using a speech optimized technique such as Code Excited Linear Prediction (CELP) coding, while the excitation in music mode is quantified by a transform coding technique, for example a Transform Coding Excitation (TCX). The LP synthesis filter 240 of the decoder is common for both music and speech signals.

A conventional coder for encoding either speech or music signals operates on blocks or segments, which are usually called frames, of 10 ms to 40 ms. Since in general, transform coding is more efficient when the frame size is large, these 10 ms to 40 ms frames are generally too short to align a transform coder to obtain acceptable quality, particularly at low bit rates. An embodiment of the invention therefore operates on superframes consisting of an integral number of standard 20 ms frames. A typical superframe sized used in an embodiment is 60 ms. Consequently, the speech/music classifier preferably performs its classification once for each consecutive superframe.

Unlike current transform coders for coding music signals, the coding process according to the invention is performed in the excitation domain. This is a product of the use of a single LP synthesis filter for the reproduction of both types of signals, speech and music. Referring to FIG. 3*a*, a transform encoder according to an embodiment of the invention is illustrated. A Linear Predictive (LP) analysis filter 310 analyzes music signals of the classified music superframe output from the speech/music classifier 250 to obtain appropriate Linear Predictive Coefficients (LPC). An LP quantization module 320 quantifies the calculated LPC coefficients. The LPC coefficients and the music signals of the superframe are then applied to an inverse filter 330 that has as input the music signal and generates as output a residual signal.

The use of superframes rather than typical frames aids in obtaining high quality transform coding. However, blocking distortion at superframe boundaries may cause quality problems. A preferred solution to alleviate the blocking distortion effect is found in an overlap-add window technique, for example, the Modified Lapped Transform (MLT) technique having an overlapping of adjacent frames of 50%. However, such a solution would be difficult to integrate into a CELP based hybrid codec because CELP employs zero overlap for speech coding. To overcome this difficulty and ensure the high quality performance of the system in music mode, an embodiment of the invention provides an asymmetrical overlap-add window method as implemented by overlap-add module 340 in FIG. 3*a*. FIG. 3*b* depicts the asymmetrical overlap-add window operation and effects. Referring to FIG. 3*b*, the overlap-add window takes into account the possibility that the previous superframe may have different values for superframe length and overlap length denoted, for example, by $N_p$ and $L_p$, respectively. The designators $N_c$ and $L_c$ represent the superframe length and the overlap length for the current superframe, respectively. The encoding block for the current superframe comprises the current superframe samples and overlap samples. The overlap-add windowing occurs at the first $N_p$ samples and the last $L_p$ samples in the current encoding block. By way of example and not limitation, an input signal x(n) is transformed by an overlap-add window function w(n) and produces a windowed signal y(n) as follows:

$$y(n)=x(n)w(n),\ 0\leq n\leq N_c+L_c-1 \qquad \text{(equation 1)}$$

and the window function w(n) is defined as follows:

$$w(n)=\begin{cases}\sin\left(\frac{\pi}{2L_p}(n+0.5)\right), & 0\leq n\leq L_p-1\\ 1, & L_p\leq n\leq N_c-1\\ 1-\sin\left(\frac{\pi}{2L_c}(n-N_c+0.5)\right), & N_c\leq n\leq N_c+L_c-1\end{cases} \qquad \text{(equation 2)}$$

wherein $N_c$ and $L_c$ are the superframe length and the overlap length of the current superframe, respectively.

It can be seen from the overlap-add window form in FIG. 3*b* that the overlap-add areas 390, 391 are asymmetrical, for example, the region marked 390 is different from the region marked 391, and the overlap-add windows may be different in size from each other. Such size variable windows overcome the blocking effect and pre-echo. Also, since the overlap regions are small compared to the 50% overlap utilized in the MLT technique, this asymmetrical overlap-add window method is efficient for a transform coder integratable into a CELP based speech coder as will be described.

Referring again to FIG. 3*a*, the residual signal output from the inverse LP filter 330 is processed by the asymmetrical overlap-add windowing module 340 for producing a windowed signal. The windowed signal is then input to a Discrete Cosine Transformation (DCT) module 350, wherein the windowed signal is transformed into the frequency domain and a set of DCT coefficients obtained. The DCT transformation is defined as:

$$Z(k)=\sqrt{\frac{2}{K}}\sum_{i=0}^{K-1}c(k)Z(i)\cos\left(\frac{(i+0.5)k\pi}{K}\right),\ 0\le k\le K-1 \qquad \text{(equation 3)}$$

where c(k) is defined as:

$$c(k)=\begin{cases}1/\sqrt{2},\ k=0\\ 1,\ \text{otherwise}\end{cases}\quad \text{and } K \text{ is the transformation size}$$

Although the DCT transformation is preferred, other transformation techniques may also be applied, such techniques including the Modified Discrete Cosine Transformation (MDCT) and the Fast Fourier Transformation (FFT). In order to efficiently quantify the DCT coefficients, dynamic bit allocation information is employed as part of the DCT coefficients quantization. The dynamic bit allocation information is obtained from a dynamic bit allocation module 370 according to masking thresholds computed by a threshold masking module 360, wherein the threshold masking is based on the input signal or on the LPC coefficients output from the LPC analysis module 310. The dynamic bit allocation information may also be obtained from analyzing the input music signals. With the dynamic bit allocation information, the DCT coefficients are quantified by quantization module 380 and then transmitted to the decoder.

In keeping with the encoding algorithm employed in the above-described embodiment of the invention, the transform decoder is illustrated in FIG. 4. Referring to FIG. 4, the transform decoder comprises an inverse dynamic bit allocation module 410, an inverse quantization module 420, a DCT inverse transformation module 430, an asymmetrical overlap-add window module 440, and an overlap-add module 450. The inverse dynamic bit allocation module 410 receives the transmitted bit allocation information output from the dynamic bit allocation module 370 in FIG. 3*a* and provides the bit allocation information to the inverse quantization module 420. The inverse quantization module 420 receives the transmitted music bit-stream and the bit allocation information and applies an inverse quantization to the bit-stream for obtaining decoded DCT coefficients. The DCT inverse transformation module 430 then conducts inverse DCT transformation of the decoded DCT coefficients and generates a time domain signal. The inverse DCT transformation is shown as follows:

$$Z(i)=\sqrt{\frac{2}{K}}\sum_{k=0}^{K-1}c(k)Z(k)\cos\left(\frac{(i+0.5)k\pi}{K}\right),\ 0\le i\le K-1 \qquad \text{(equation 4)}$$

where c(k) is defined as:

$$c(k)=\begin{cases}1/\sqrt{2},\ k=0\\ 1,\ \text{otherwise}\end{cases}\quad \text{and } K \text{ is the transformation size.}$$

The overlap-add windowing module 440 performs the asymmetrical overlap-add windowing operation on the time domain signal, for example, ŷ'(n)=w(n)ŷ(n), where ŷ(n) represents the time domain signal, w(n) denotes the windowing function and ŷ'(n) is the resulting windowed signal. The windowed signal is then fed into the overlap-add module 450, wherein an excitation signal is obtained via performing an overlap-add operation By way of example and not limitation, an exemplary overlap-add operation is as follows:

$$\hat{e}(n)=\begin{cases}w_p(n+N_p)\hat{y}_p(n+N_p)+w_c(n)\hat{y}_c(n),\ 0\le n\le L_p-1\\ \hat{y}_c(n),\ L_p\le n\le N_c-1\end{cases} \qquad \text{(equation 5)}$$

wherein ê(n) is the excitation signal, and $\hat{y}_p(n)$ and $\hat{y}_c(n)$ are the previous and current time domain signals, respectively. Functions $w_p(n)$ and $w_c(n)$ are respectively the overlap-add window functions for previous and current superframes. Values $N_p$ and $N_c$ are the sizes of the previous and current superframes respectively. Value $L_p$ is the overlap-add size of the previous superframe. The generated excitation signal ê(n) is then switchably fed into an LP synthesis filter as illustrated in FIG. 2*b* for reconstructing the original music signal.

An interpolation synthesis technique is preferably applied in processing the excitation signal. The LP coefficients are interpolated every several samples over the region of $0\leqq n\leqq L_p-1$, wherein the excitation is obtained employing the overlap-add operation. The interpolation of the LP coefficients is performed in the Line Spectral Pairs (LSP) domain, whereby the values of interpolated LSP coefficients are given by:

$$f(i)=(1-v(i))\hat{f}_p(i)+v(i)\hat{f}_c(i),\ 0\leqq i\leqq M-1 \qquad \text{(equation6)}$$

where $\hat{f}_p(i)$ and $\hat{f}_c(i$ are the quantified LSP parameters of the previous and current superframes respectively. Factor v(i) is the interpolation weighting factor, while value M is the order of the LP coefficients. After use of the interpolation technique, conventional LP synthesis techniques may be applied to the excitation signal for obtaining a reconstructed signal.

Referring to FIGS. 5*a* and 5*b*, exemplary steps taken to encode interleaved input speech and music signals in accordance with an embodiment of the invention will be described. At step 501, an input signal is received and a superframe is formed. At step 503, it is decided whether the current superframe is different in type (i.e., music/speech) from a previous superframe. If the superframes are different, then a "superframe transition" is defined at the start of the current superframe and the flow of operations branches to step 505. At step 505, the sequence of the previous superframe and the current superframe is determined, for example, by determining whether the current superframe is music. Thus, for example, execution of step 505 results in a "yes" if the previous superframe is a speech superframe followed by a current music superframe. Likewise step 505 results in a "no" if the previous superframe is a music superframe followed by a current speech superframe. In step 511, branching from a "yes" result at step 505, the overlap length $L_p$ for the previous speech superframe is set to zero, meaning that no overlap-add window will be performed at the beginning of the current encoding block. The reason for this is that CELP based speech coders do not provide or utilize overlap signals for adjacent frames or superframes. From step 511, transform encoding procedures are executed for the music superframe at step 513. If the decision at step 505 results in a "no", the operational flow branches to step 509, where the overlap samples in the previous music superframe are discarded. Subsequently, CELP coding is performed in step 515 for the speech superframe. At step 507, which branches from step 503 after a "no" result, it is decided whether the current superframe is a music or a speech superframe. If the current superframe is a music superframe, transform encoding is applied at step 513, while if the current superframe is speech, CELP encoding procedures are applied at step 515. After the transform encoding is completed at step 513, an encoded music bit-stream is produced. Likewise after performing CELP encoding at step 515, an encoded speech bit-stream is generated.

The transform encoding performed in step 513 comprises a sequence of sub-steps as shown in FIG. 5*b*. At step 523, the LP coefficients of the input signals are calculated. At step 533, the calculated LPC coefficients are quantized. At step 543, an inverse filter operates on the received superframe and the calculated LPC coefficients to produce a residual signal x(n). At step 553, the overlap-add window is applied to the residual signal x(n) by multiplying x(n) by the window function w(n) as follows:

$$y(n)=x(n)w(n)$$

wherein the window function w(n) is defined as in equation 2. At step 563, the DCT transformation is performed on the windowed signal y(n) and DCT coefficients are obtained. At step 583, the dynamic bit allocation information is obtained according to a masking threshold obtained in step 573. Using the bit allocation information, the DCT coefficients are then quantified at step 593 to produce a music bit-stream.

In keeping with the encoding steps shown in FIGS. 5*a* and 5*b*, FIGS. 6*a* and 6*b* illustrate the steps taken by a decoder to provide a synthesized signal in an embodiment of the invention. Referring to FIG. 6*a*, at step 601, the transmitted bit stream and the mode bit are received. At step 603, it is determined whether the current superframe corresponds to music or speech according to the mode bit. If the signal corresponds to music, a transform excitation is generated at step 607. If the bit stream corresponds to speech, step 605 is performed to generate a speech excitation signal as by CELP analysis. Both of steps 607 and 605 merge at step 609. At step 609, a switch is set so that the LP synthesis filter receives either the music excitation signal or the speech excitation signal as appropriate. When superframes are overlap-added in a region such as for example, $0 \leqq n \leqq L_p-1$, it is preferable to interpolate the LPC coefficients of the signals in this overlap-add region of a superframe. At step 611, interpolation of the LPC coefficients is performed. For example, equation 6 may be employed to conduct the LPC coefficient interpolation. Subsequently at step 613, the original signal is reconstructed or synthesized via an LP synthesis filter in a manner well understood by those skilled in the art.

According to the invention, the speech excitation generator may be any excitation generator suitable for speech synthesis, however the transform excitation generator is preferably a specially adapted method such as that described by FIG. 6*b*. Referring to FIG. 6*b*, after receiving the transmitted bit-stream in step 617, inverse bit-allocation is performed at step 627 to obtain bit allocation information. At step 637, the DCT coefficients are obtained by performing an inverse DCT quantization of the DCT coefficients. At step 647, a preliminary time domain excitation signal is reconstructed by performing an inverse DCT transformation, defined by equation 4, on the DCT coefficients. At step 657, the reconstructed excitation signal is further processed by applying an overlap-add window defined by equation 2. At step 667, an overlap-add operation is performed to obtain the music excitation signal as defined by equation 5.

Although it is not required, the present invention may be implemented using instructions, such as program modules, that are executed by a computer. Generally, program modules include routines, objects, components, data structures and the like that perform particular tasks or implement particular abstract data types. The term "program" as used herein includes one or more program modules.

The invention may be implemented on a variety of types of machines, including cell phones, personal computers (PCs), hand-held devices, multi-processor systems, microprocessor-based programmable consumer electronics, network PCs, minicomputers, mainframe computers and the like, or on any other machine usable to code or decode audio signals as described herein and to store, retrieve, transmit or receive signals. The invention may be employed in a distributed computing system, where tasks are performed by remote components that are linked through a communications network.

With reference to FIG. 7, one exemplary system for implementing embodiments of the invention includes a computing device, such as computing device 700. In its most basic configuration, computing device 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 within line 706. Additionally, device 700 may also have additional features/functionality. For example, device 700 may also include additional storage (removable and/or non-removable) including, but not limited to, magnetic or optical disks or tape. Such additional storage is illustrated in FIG. 7 by removable storage 708 and non-removable storage 710. Computer storage media include volatile and nonvolatile, removable and non-removable media implemented in any method or technology for storage of information such as computer readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 700. Any such computer storage media may be part of device 700.

Device 700 may also contain one or more communications connections 712 that allow the device to communicate with other devices. Communications connections 712 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Device 700 may also have one or more input devices 714 such as keyboard, mouse, pen, voice input device, touch input device, etc. One or more output devices 716 such as a display, speakers, printer, etc. may also be included. All these devices are well known in the art and need not be discussed at greater length here.

A new and useful transform coding method efficient for coding music signals and suitable for use in a hybrid codec employing a common LP synthesis filter have been provided. In view of the many possible embodiments to which the principles of this invention may be applied, it should be recognized that the embodiments described herein with respect to the drawing figures are meant to be illustrative only and should not be taken as limiting the scope of invention. Those of skill in the art will recognize that the illustrated embodiments can be modified in arrangement and detail without departing from the spirit of the invention. Thus, while the invention has been described as employing a DCT transformation, other transformation techniques such as Fourier transformation modified discrete cosine transformation may also be applied within the scope of the invention. Similarly, other described details may be altered or substituted without departing from the scope of the invention. Therefore, the invention as described herein contemplates all such embodiments as may come within the scope of the following claims and equivalents thereof.

We claim:

1. A method for decoding a portion of a coded signal, the portion comprising a coded speech signal or a coded music signal, the method comprising the steps of:

determining whether the portion of the coded signal corresponds to a coded speech signal or to a coded music signal;

providing the portion of the coded signal to a speech excitation generator if it is determined that the portion of the coded signal corresponds to a coded speech signal, wherein an excitation signal is generated in keeping with a linear predictive procedure;

providing the portion of the coded signal to a transform excitation generator if it is determined that the portion of the coded signal corresponds to a coded music signal, wherein an excitation signal is generated in keeping with a transform coding procedure, wherein the coded music signal is formed according to an asymmetrical overlap-add transform method comprising the steps of:

receiving a music superframe consisting of a sequence of input music signals;

generating a residual signal and a plurality of linear predictive coefficients for the music superframe according to a linear predictive principle;

applying an asymmetrical overlap-add window to the residual signal of the superframe to produce a windowed signal;

performing a discrete cosine transformation on the windowed signal to obtain a set of discrete cosine transformation coefficients;

calculating dynamic bit allocation information according to the input music signals or the linear predictive coefficients; and quantifying the discrete cosine transformation coefficients according to the dynamic bit allocation information; and switching the input of a common linear predictive synthesis filter between the output of the speech excitation generator and the output of the transform excitation generator, whereby the common linear predictive synthesis filter provides as output a reconstructed signal corresponding to the input excitation.

2. The method of claim 1, wherein the superframe is comprised of a series of elements, and wherein the step of applying an asymmetrical overlap-add window further comprises the steps of:

creating the asymmetrical overlap-add window by:

modifying a first sub-series of elements of a present superframe in accordance with a last sub-series of elements of a previous superframe; and modifying a last sub-series of elements of the present superframe in accordance with a first sub-series of elements of a subsequent superframe; and multiplying the window by the present superframe in the time domain.

3. The method of claim 2, further comprising the step of:

conducting an interpolation of a set of linear predictive coefficients.

4. A computer readable medium having instructions thereon for performing steps for decoding a portion of a coded signal, the portion comprising a coded speech signal or a coded music signal, the steps comprising:

determining whether the portion of the coded signal corresponds to a coded speech signal or to a coded music signal;

providing the portion of the coded signal to a speech excitation generator if it is determined that the portion of the coded signal corresponds to a coded speech signal, wherein an excitation signal is generated in keeping with a linear predictive procedure;

providing the portion of the coded signal to a transform excitation generator if it is determined that the portion of the coded signal corresponds to a coded music signal, wherein an excitation signal is generated in keeping with a transform coding procedure, wherein the coded music signal is formed according to an asymmetrical overlap-add transform method comprising the steps of:

receiving a music superframe consisting of a sequence of input music signals;

generating a residual signal and a plurality of linear predictive coefficients for the music superframe according to a linear predictive principle;

applying an asymmetrical overlap-add window to the residual signal of the superframe to produce a windowed signal;

performing a discrete cosine transformation on the windowed signal to obtain a set of discrete cosine transformation coefficients;

calculating dynamic bit allocation information according to the input music signals or the linear predictive coefficients; and quantifying the discrete cosine transformation coefficients according to the dynamic bit allocation information; and switching the input of a common linear predictive synthesis filter between the output of the speech excitation generator and the output of the transform excitation generator, whereby the common linear predictive synthesis filter provides as output a reconstructed signal corresponding to the input excitation.

5. The computer readable medium according to claim 4, wherein the superframe is comprised of a series of elements, and wherein the step of applying an asymmetrical overlap-add window further comprises the steps of:

creating the asymmetrical overlap-add window by:

modifying a first sub-series of elements of a present superframe in accordance with a last sub-series of elements of a previous superframe; and modifying a last sub-series of elements of the present superframe in accordance with a first sub-series of elements of a subsequent superframe; and multiplying the window by the present superframe in the time domain.

6. An apparatus for processing a superframe signal, wherein the superframe signal comprises a sequence of speech signals or music signals, the apparatus comprising:

a speech/music classifier for classifying the superframe as being a speech superframe or music superframe;

a speech/music encoder for encoding the speech or music superframe and providing a plurality of encoded signals, wherein the speech/music encoder comprises a music encoder employing a transform coding method to produce an excitation signal for reconstructing the music superframe using a linear predictive synthesis filter, wherein the music encoder further comprises:

a linear predictive analysis module for analyzing the music superframe and generating a set of linear predictive coefficients;

a linear predictive coefficients quantization module for quantifying the linear predictive coefficients;

an inverse linear predictive filter for receiving the linear predictive coefficients and the music superframe and providing a residual signal;

an asymmetrical overlap-add windowing module for windowing the residual signal and producing a windowed signal;

a discrete cosine transformation module for transforming the windowed signal to a set of discrete cosine transformation coefficients;

a dynamic bit allocation module for providing bit allocation information based on at least one of the input signal or the linear predictive coefficients; and a discrete cosine transformation coefficients quantization module for quantifying the discrete cosine transformation coefficients according to the bit allocation information; and a speech/music decoder for decoding the encoded signals, comprising:

a transform decoder that performs an inverse of the transform coding method for decoding the encoded music signals; and a linear predictive synthesis filter for generating a reconstructed signal according to a set of linear predictive coefficients, wherein the filter is usable for the reproduction of both of music and speech signals.

7. An apparatus for processing a superframe signal, wherein the superframe signal comprises a sequence of speech signals or music signals, the apparatus comprising:

a speech/music classifier for classifying the superframe as being a speech superframe or music superframe;

a speech/music encoder for encoding the speech or music superframe and providing a plurality of encoded signals, wherein the speech/music encoder comprises a music encoder employing a transform coding method to produce an excitation signal for reconstructing the music superframe using a linear predictive synthesis filter; and a speech/music decoder for decoding the encoded signals, comprising:

a transform decoder that performs an inverse of the transform coding method for decoding the encoded music signals, wherein the transform decoder further comprises:

a dynamic bit allocation module for providing bit allocation information;

an inverse quantization model for transferring quantified discrete cosine transformation coefficients into a set of discrete cosine transformation coefficients;

a discrete cosine inverse transformation module for transforming the discrete cosine transformation coefficients into a time-domain signal;

an asymmetrical overlap-add windowing module for windowing the time-domain signal and producing a windowed signal; and an overlap-add module for modifying the windowed signal based on the asymmetrical windows; and a linear predictive synthesis filter for generating a reconstructed signal according to a set of linear predictive coefficients, wherein the filter is usable for the reproduction of both of music and speech signals.

* * * * *

UNITED STATES PATENT AND TRADEMARK OFFICE

CERTIFICATE OF CORRECTION

PATENT NO. : 6,658,383 B2 
DATED : December 2, 2003
INVENTOR(S) : Koishida et al.

It is certified that error appears in the above-identified patent and that said Letters Patent is hereby corrected as shown below:

Title page,
Item [75], Inventors, “Kazuhito Koishida, Goleta, CA (US)” should read -- Kazuhito Koishida, Redmond, WA (US) --; and “Allen Gersho, Goleta, CA (US)” should read -- Allen Gersho, Santa Barbara, CA (US) --.

Column 6,
Line 42, “$f_c$(i” should read -- $f_c$(i) --.

Signed and Sealed this

Twenty-fifth Day of May, 2004

JON W. DUDAS
*Acting Director of the United States Patent and Trademark Office*